INVENTOR.
DANIEL CERCONE

United States Patent Office 3,257,723
Patented June 28, 1966

3,257,723
SHEARS
Daniel Cercone, 4720 Liberty Ave., Pittsburgh, Pa.
Filed Oct. 21, 1963, Ser. No. 317,603
4 Claims. (Cl. 30—195)

My invention relates to shears and more particularly to serrated type of shears for use in cutting human hair.

In accordance with the prior art of which I am aware, barber shears have been used for thinning purposes which are known as thinning shears and which comprise two blades pivotally interconnected so as to produce a cutting or shearing action as the blades are rotated with respect to each other. One of the blades in thinning shears of the prior art presents substantially a straight line edge. The other blade comprises a large number of finely separated narrow teeth extending parallel to each other, having parallel sides and being concave shaped at their ends. In the action of shears of this type, part of the hair will fall into the interstices between adjacent teeth and part of the hair will be caught in the concave grooves at the ends of the teeth. The shears are constructed so that cutting action occurs at the concave ends of the teeth and not at the bottom of the interstices between the teeth. Thus, only those hairs which have been caught in the grooves on the point or end of the teeth will be severed in the cutting operation while the hairs which have fallen into the gaps or interstices between the teeth will be unaffected. With shears of this type, a skilled barber can produce some amazing artistic configurations. However, I have found that in teaching students in the art of cutting hair, it is very difficult for them to acquire the skills required for producing certain types of waves which are highly desirable from the aesthetic viewpoint.

It is, therefore, an object of my invention to provide a barber shear with which a relatively unskilled craftsman can produce a wave which is now produced only by a highly skilled barber.

It is another object of my invention to produce a barber shear for producing artistic waves in hair with less effort and greater speed than is possible with existing shears.

It is an ancillary object of my invention to produce and improved barber tool.

It is another ancillary object of my invention to provide a novel and useful article of manufacture.

It has normally been assumed that in order to produce a variation in a line of cutting with shears, the shears must be designed with transverse irregularities as is done in the classical common pinking shears and that any curvature of the shear blades in a direction perpendicular to the pivot axis of the shears would have no effect on the line of cut. However, in accordance with my invention, I have provided thinning shears comprising one blade having teeth similar to those customarily employed in the art and the other blade being curved through one or more arcs, these curves extending in arcs, the axes of which are parallel to the pivot axis of the shears. With shears of this type I have found that barbers with relatively little skill in producing artistic waves are able to produce artistic configurations comparable to those produced by experts. I have found that depending on the type of configurations which are being created, different types of undulations are desirable, e.g., in accordance with one embodiment of my invention I provide a blade having a single convex curve. In accordance with another embodiment of my invention, I provide a blade having a single concave curve. In accordance with other embodiments of my invention I provide a plurality of concave or convex curves.

Since the cutting action is to occur at the ends of teeth and not at the bottoms of the interstices between the teeth there is a preferred relationship between the arc or depth of the curve of the curved blade and the length of the teeth. Preferably, the depth of the curve should not exceed the length of the teeth, e.g., in the preferred embodiment of my invention, the shears should be so shaped that when they are in the closed position no part of the cutting portion of the curved blade should be below the bottoms of the interstices between the teeth.

In producing shears to be used in highly artistic work, I have found that a maximum of control is desirable. For a maximum of control, the pressure on the fingers of the operator should be constant throughout the operation. In the traditional shears the finger holes are made substantially larger than the fingers of the operator so that during one phase of the operation there is substantial pressure between the shear handle and the fingers thereby compressing the flesh of the operator whereas in other phases of the operation there is substantially no pressure between the handles of the shears and the fingers of the operator so that there is virtually no compression of the flesh of the fingers. This and other similar effects produce a lack of control which is undesirable for a delicate operation. I have found, however, that if the shears are provided with a spring bias means, biasing the shears toward the open position with a force approximately equal to that required to overcome the frictional resistances of the shears when they are being opened, a much higher degree of control is obtainable. Preferably, the spring bias should be operable through an arc from the closed position to the position where the axes of the shear blades are at an angle of 30° apart.

Since it is desirable that the shears be in a closed position when not in use, I therefore provide means for locking the shears in a closed position by a motion which is accomplished entirely with the one hand which is holding the shears.

While the foregoing serves to summarize the main features of my invention and to be an introduction, the invention itself, however, will best be understood from the following description when read in connection with the accompanying drawing in which.

Figure 1:
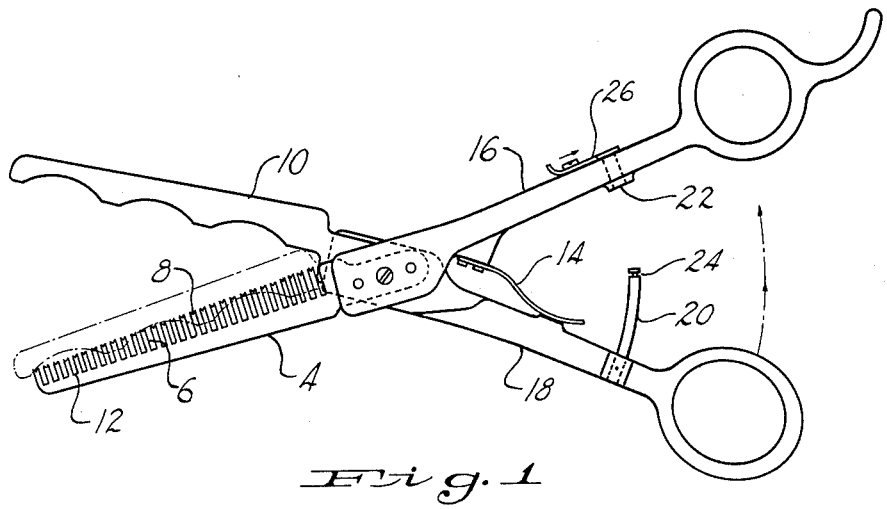
FIGURE 1 is a plan view of a pair of spring biased shears with a concave blade in accordance with one embodiment of my invention.
Figure 2:
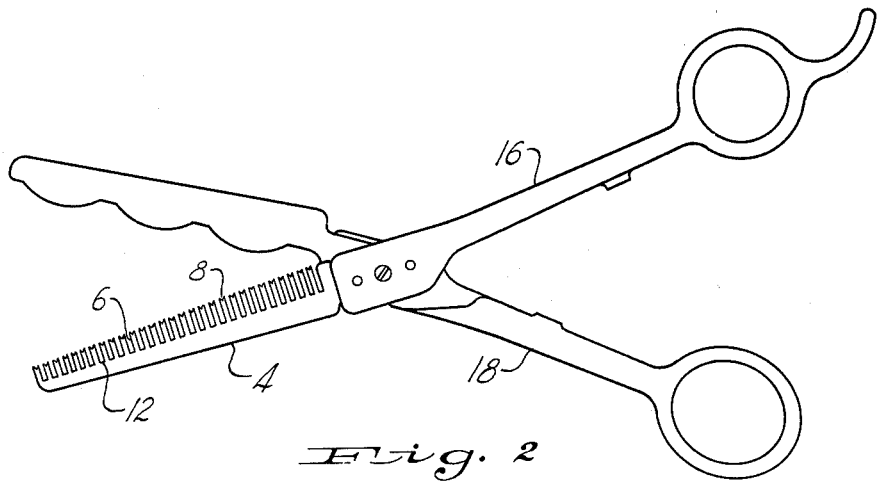
FIGURE 2 is a plan view of apparatus in accordance with my invention wherein a plurality of convex curves are employed.
Figure 3:
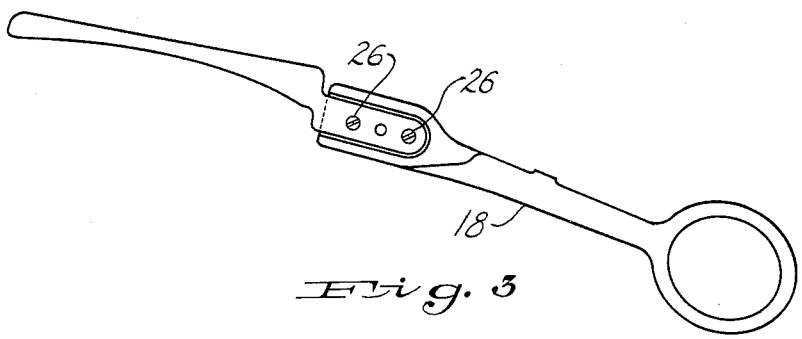
FIGURE 3 is a showing of one blade of apparatus in accordance with one embodiment of my invention wherein a single concave curvature is employed.

In accordance with the preferred embodiment of my invention I have provided a pair of barber shears comprising a pair of cooperating cutting blades. The first 4 of these blades comprises a plurality of teeth 6 which are of rectangular shape and have a concave indentation 8 on the end thereof. The teeth are preferably spaced so that the distance between the teeth or the interstices are approximately equal to the width of the teeth as measured longitudinally along the length of the first blade 4.

A second blade 10 is provided for cooperating with the toothed or serrated blade 4 which second blade 10 is curved along an arc, the axis of which arc is parallel to the axis through the junction of the two blades. The curved sections or arcs of the curved or modulated blade are so oriented and of such a depth that when the blades are not in a closed position the entire length of the curved blades will be past the point of contact with the end of the teeth on the serrated blade while none of the cutting edges of the curved blade 10 will be beyond or below the lower edge 12 of the grooves or interstices between adjacent teeth of the serrated blade. In other words, the groove between the two blades is such that all of the cutting action occurs between the curved blade 10 and the points 8 of the teeth of the serrated blade.

In use, the curved blade 10 moving through the hair to be cut tends to produce a variation in distribution of the hair along the length of the curved blade so that the number of hairs per unit length is greater in one region of the curved blade than it is in another region of the curved blade. Thus, when the shears are closed and perform a cutting action, there will be a tendency to cut a larger percentage of the hairs in one region than in another region.

As shown in FIGURE 1, I provide a spring 14 between the handles 16, 18 attached to the two blades, biasing the two blades toward the open position with a decreasing tension as the blades are separated further apart until the blades reach an angle of approximately 30° apart beyond which point no biasing occurs. This is accomplished by having the spring 14 attached to one blade 16 and being in the form of a leaf spring and extending against the other blade 18 in a region distant from the finger grips or finger and thumb openings of the handle of the shears so that the spring is out of the way of the hands of the operator.

In addition, I provide a locking device comprising a curved rod 20 attached to one of the handle portions 18 and disposed to cooperate with a hole 22 through the other handle portion 16 so that when the shears are in a closed condition the curved rod extends through the hole 22 in the second handle portion 16 and a short distance beyond. On the end of the curved rod 20 I provide a groove 24 along each side of the rod in a direction parallel to the long dimension of the shears. Mounted on the first handle portion 16 so as to cooperate with the hole 22 through the first handle portion 16 and the locking rod tip 24 when it extends through the second blade, I provide a sliding catch 26 which may be slid or caused to slide by the motion of the operator's fingers into engagement with the slots 24 near the end of the locking rod 20 so as to lock the rod 20 in place and in turn to lock the scissors or shears in a closed position when not in use.

While I have shown an embodiment wherein the ends of the teeth of the serrated teeth portion of the toothed blade 4 are in a straight line alignment, nevertheless, it is understood that the teeth points could be provided in a curved or arc shaped relative alignment if the cooperating curved blade were properly constructed to meet the boundary conditions described above.

In accordance with my invention, the cutting blades and the handle portions may be constructed either of single pieces of steel or they may be constructed of separate pieces of steel fastened together with screws 26 so that the cutting blades could be changed without need of replacing the handle portions 16, 18 of the shears and so that the cutting blades might be constructed of a different material from the material of which the handle portions are constructed.

Thus, by providing the curvatures on the non-serrated blade in cooperation with a serrated blade which provides substantially a straight line cutting surface, I provide a set of thinning shears which are capable of producing a non-uniform cutting distribution which may be employed to produce accurate artistic wave configurations by a barber or beautician.

While I have shown and described the specific embodiments of my invention, the invention itself however will be more clearly defined by the appended claims.

What I claim is:

1. Barber shears for shaping hair to a desired hair style comprising a first blade having a longitudinally straight cutting edge which is serrated to produce a thinning effect having a plurality of teeth with parallel sides and concave ends; a second blade pivotally connected to said first blade so as to move cooperatively against said first blade, said second blade having a longitudinally arcuate shaped cutting edge oriented to cooperate with the cutting edges of the teeth of the said first blade, said arcuate cutting edge being arced in a plane substantially parallel to the plane of blade movement.

2. Barber shears for shaping hair to a desired hair style as described in claim 1 comprising a pair of cooperating pieces connected pivotally near their center so as to provide said cutting blades on one side of a pivot axis and a gripping portion on the other side of the pivot axis, said gripping portion provided with finger and thumb openings therethrough, means removably attached to one of said pieces on the gripping side of said pivot axis to provide said pieces with a resistance to being moved toward each other, said resistance means engaging when said blades are moved toward each other to form an angle of less than 30 degrees.

3. Barber shears as recited in claim 1 wherein said longitudinally arcuate cutting edge forms a curved line in convex relation to said straight cutting edge of said first blade.

4. Barber shears as recited in claim 1 wherein said longitudinally arcuate cutting edge forms a curved line in concave relation to said straight cutting edge of said first blade.

References Cited by the Examiner

UNITED STATES PATENTS

| 202,496 | 4/1878 | Wegmouth | 30—355 X |
| 1,641,054 | 8/1927 | Schanning | 30—261 X |
| 2,638,669 | 5/1953 | Steede | 30—262 |
| 2,677,179 | 5/1954 | Servilla | 30—195 X |
| 2,758,371 | 8/1956 | Marchesani | 30—195 |

WILLIAM FELDMAN, Primary Examiner.

J. C. PETERS, Assistant Examiner.